United States Patent
Hathaway et al.

(10) Patent No.: US 9,365,155 B2
(45) Date of Patent: Jun. 14, 2016

(54) ADVANCED WARNING AND RISK EVASION SYSTEM AND METHOD

(71) Applicant: Oldcastle Materials, Inc., Atlanta, GA (US)

(72) Inventors: Edwin Hathaway, Santa Monica, CA (US); Mark Green, New York, NY (US); Kent Baumann, Rockwall, TX (US); Chad Green, Ashburn, VA (US); Lee Cole, Brandon, MS (US); Chris Schwedtmann, Columbia, MO (US)

(73) Assignee: Oldcastle Materials, Inc., Atlanta, GA (US)

( * ) Notice: Subject to any disclaimer, the term of this patent is extended or adjusted under 35 U.S.C. 154(b) by 79 days.

(21) Appl. No.: 14/500,778

(22) Filed: Sep. 29, 2014

(65) Prior Publication Data
US 2015/0091716 A1    Apr. 2, 2015

Related U.S. Application Data

(60) Provisional application No. 61/884,030, filed on Sep. 28, 2013.

(51) Int. Cl.
*G01S 13/88*    (2006.01)
*B60Q 1/52*    (2006.01)
*B60Q 5/00*    (2006.01)
(Continued)

(52) U.S. Cl.
CPC ............... *B60Q 1/525* (2013.01); *B60Q 5/006* (2013.01); *G01S 7/003* (2013.01); *G01S 7/10* (2013.01); *G01S 7/22* (2013.01); *G01S 13/86* (2013.01); *G01S 13/931* (2013.01); *G08B 21/02* (2013.01); *G08G 1/052* (2013.01); *G08G 1/0955* (2013.01); *G08G 1/162* (2013.01); *G01S 7/24* (2013.01); *G01S 7/4026* (2013.01); *G01S 13/91* (2013.01); *G01S 2007/4082* (2013.01); *G01S 2013/936* (2013.01); *G01S 2013/9357* (2013.01); *G01S 2013/9375* (2013.01); *G01S 2013/9378* (2013.01); *G08G 1/04* (2013.01); *G08G 1/042* (2013.01)

(58) Field of Classification Search
CPC ....... G01S 13/88; G01S 13/93; G01S 13/931; G01G 1/16; G01G 1/166; B60Q 1/525; B60Q 5/001; B60Q 5/006
See application file for complete search history.

(56) References Cited

U.S. PATENT DOCUMENTS

| | | | | |
|---|---|---|---|---|
| 2012/0293360 | A1* | 11/2012 | Hasegawa | G01S 13/34 342/146 |
| 2013/0088382 | A1* | 4/2013 | Lee | G01S 7/4026 342/174 |
| 2014/0347206 | A1* | 11/2014 | Steinlechner | G01S 7/4026 342/5 |

*Primary Examiner* — Andrew Bee
(74) *Attorney, Agent, or Firm* — Winstead PC

(57) ABSTRACT

This invention relates in general to the field of safety devices, and more particularly, but not by way of limitation, to systems and methods for providing advanced warning and risk evasion when hazardous conditions exist. In one embodiment, a vicinity monitoring unit is provided for monitoring, for example, oncoming traffic near a construction zone. In some embodiments, the vicinity monitoring unit may be mounted onto a construction vehicle to monitor nearby traffic and send a warning signal if hazardous conditions exist. In some embodiments, personnel tracking units may be worn by construction workers and the personnel tracking units may be in communication with the vicinity monitoring unit. In some embodiments, a base station is provided for monitoring activities taking place in or near a construction site including monitoring the locations of various personnel and vehicles within the construction site.

20 Claims, 14 Drawing Sheets

(51) Int. Cl.
*G01S 13/93* (2006.01)
*G08B 21/02* (2006.01)
*G08G 1/052* (2006.01)
*G08G 1/0955* (2006.01)
*G08G 1/16* (2006.01)
*G01S 7/00* (2006.01)
*G01S 7/10* (2006.01)
*G01S 7/22* (2006.01)
*G01S 13/86* (2006.01)
*G08G 1/04* (2006.01)
*G08G 1/042* (2006.01)
*G01S 7/24* (2006.01)
*G01S 7/40* (2006.01)
*G01S 13/91* (2006.01)

ADVANCED WARNING AND RISK EVASION SYSTEM AND METHOD

CROSS-REFERENCE TO RELATED APPLICATIONS

The present application claims priority to U.S. Provisional Patent Application Ser. No. 61/884,030, filed Sep. 28, 2013 entitled, "Advanced Warning And Risk Evasion System And Method," which is hereby incorporated by reference for all purposes.

BACKGROUND

1. Technical Field

This invention relates in general to the field of safety devices, and more particularly, but not by way of limitation, to systems and methods for providing advanced warning and risk evasion when hazardous conditions exist.

2. Background

Devices for increasing the safety of drivers are well known and widely available. For example, signs physically placed by highway road crews to warn of an upcoming hazard or construction site have been used to alert drivers to adjust their speed to the posted limit to accommodate the upcoming road hazard or construction. One drawback of such signs is that if not properly placed or lighted, such signs may be missed by drivers. Another drawback to such signs is that since signs must be physically placed into position by appropriate personnel they often cannot be used to warn drivers of transient conditions, such as a street sweeper or paint striper truck moving slowly down a roadway. Radars transmitting in the X, K, or Ka bands have been used by law enforcement agencies to enforce speed limits for some time. Many drivers employ radar detectors which alert the driver when the vehicle is being radiated by such police radar. In response to the alert, the driver can verify his compliance with the speed limit or adjust vehicle speed to be within the posted limit.

Some highways employ radio broadcasts to alert drivers to upcoming hazards. However, radio broadcast warning systems are of limited value because these systems require the driver to tune the radio receiver to a designated AM or FM band frequency, not already assigned to another broadcaster.

Warning systems to prevent collisions between vehicles or pedestrians and trains have been used for decades. They are found in many forms. The most commonly known is a crossing gate with audible and visible warning signals. Separate from the railroad intersection warning systems is a sound blast emanating from the train itself. The sound generated by the train blast warning, can be heard, often very loudly, outside of the danger zone. These horn blasts, however, cause undue noise pollution, disturbing those living within audible range of the intersection. While attempts have been made to address the noise pollution issue, these devices continue to disrupt an unnecessarily large area surrounding an intersection. One such solution attempts to calculate the speed of an oncoming hazard in order to better time the warning signal. One prior art solution employed a triggering mechanism, speed/distance calculating and sound emission software, and an acoustic beam emitter. Such solution calculated the speed of an oncoming train in relation to a particular railway crossing. Based upon the speed of the train, the software will calculate the timing and, if needed, the type of warning blast to be emitted from the acoustic beam emitter. The acoustic beam emitter then generates a focused beam of sound in the direction of the warning zone. Due to the unique characteristics of the acoustic beam emitter, only those within the warning zone will hear the warning blast.

In the conventional systems described above, it is not practical to use signs or radio broadcast messages to alert drivers of an approaching emergency vehicle. Thus, a more reliable system to alert drivers of such hazards and conditions without distracting the driver is desirable to improve safety. No system presently exists that can predict an accident before it happens and coupled to a countermeasure to an imminent threat to provide sufficient warning in a high percentage of accident scenarios.

SUMMARY OF THE INVENTION

In accordance with the present invention, an advanced warning and risk evasion system and method is provided. In accordance with one aspect of the present invention, a complete advanced warning system is provided which includes sensors coupled to warning devices and in communication with real-time information processing to warn appropriate personnel of an impending danger. In some embodiments, the system may utilize one or more sensors and one or more sensor types, including radar-based sensors, GPS devices, and/or differential GPS tracking devices. In some embodiments, the sensors may be coupled to visual, acoustic, and/or other projection modality warning devices, such as a Long-Range Acoustic Device (LRAD) for providing a focused, acoustic warning to a small area, such as the driver of an offending vehicle. In various embodiments, the advanced warning system may provide an increased probability of hazard detection with a reduced rate of false alarms. In various embodiments, the advanced warning system may include a radar vicinity monitoring unit; a vehicle tracking unit; a personnel tracking unit; and a site monitoring unit.

In some embodiments, the advanced warning system may provide comprehensive situation awareness of on-site and near-site traffic and personnel to management via a base station. In various embodiments, the advanced warning system may contribute to site safety through sensing the location of all on-site personnel and mobile equipment, traffic in the local vicinity, and rapidly assessing potentially dangerous situations. Using that information, management may be able to monitor all movements on-site, across access points, and/or in the near vicinity in real-time. Such enhanced situation awareness may enable managers to assess broad safety and efficiency related situations and take corrective actions prior to dangerous or inefficient actions occurring. In some embodiments, the system may include an ability to simulate a potentially hazardous scenario to facilitate selection and location of sensors and warning devices and the creation of thresholds for warning activation.

The above summary of the invention is not intended to represent each embodiment or every aspect of the present invention. Particular embodiments may include one, some, or none of the listed advantages.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

In accordance with various embodiments of the present invention, an advance warning and risk evasion system and method is provided. The advanced warning system may incorporate the tracking of on-site vehicles and workers along with off-site traffic leading to predictions of accidents and appropriate warnings. One aspect of the advanced warning system provides one or more sensors adapted to detect and provide an early warning of an imminent hazard to personnel on a construction site. Hazards may include moving vehicles near a defined safe zone, such as, for example, during highway maintenance or on construction sites.

Figure 1:
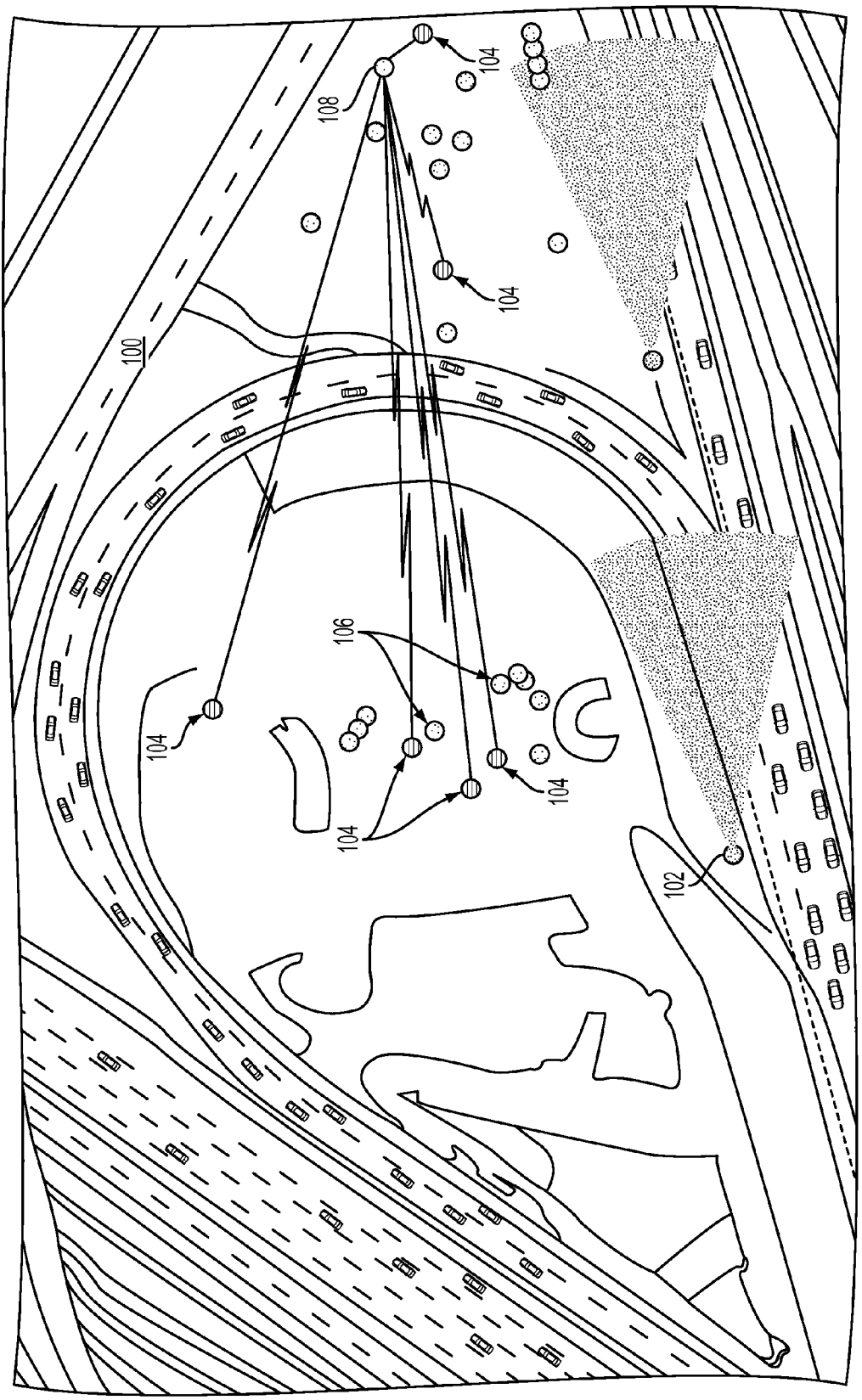
FIG. 1 illustrates an overview of an advanced warning and risk evasion system according to an embodiment of the present invention.

Referring now to FIG. 1, an embodiment of an advance warning system 100 is shown incorporating vicinity monitoring units 102; vehicle tracking units 104; personnel tracking units 106; and a site monitoring unit or base station 108. In some embodiments, the vicinity monitoring units 102 may be a radar unit that monitors traffic on the boundary of a worksite looking for aberrant driver behavior that may result in an accident. In the embodiment shown, a vicinity monitoring unit 102 has been positioned at an entrance to a construction site with a radar detection zone directed towards oncoming traffic to monitor for vehicles veering into a predetermined safety zone (shown as a dashed line). Once a dangerous situation is assessed, warnings may be transmitted to nearby personnel, an alert message may be sent to the hazardous traffic element, and/or on-site management personnel may be alerted. In various embodiments, the vicinity monitoring unit 102 may be configurable to any work site scenario. In various embodiments, the vicinity monitoring unit 102 may be a stationary unit, may be transportable, or may be mounted to a vehicle, such as, for example, via a standard trailer hitch receiver.

Still referring to FIG. 1, in some embodiments of the system 100, the vehicle tracking unit 104 may include a GPS unit or a differential GPS system that may be mounted on vehicles dedicated towards working in the construction zone. In some embodiments, the personnel tracking unit 106 may be a battery powered device that may be simpler and/or smaller than the vehicle tracking unit 104 that is designed to track the position of personnel or temporary vehicles on the construction site and transmit the positions to various other devices. In various embodiments, the base station 108 of the system 100 may be located at an onsite headquarters and may give construction site management a map display of all personnel (via the personnel tracking units 106), vehicles (via the vehicle tracking units 104), and local traffic (via the vicinity monitoring unit 102). The system 100 may include personnel tracking unit 106 and/or vehicle tracking unit 104 optimized for low-power and maintain a charge using a photocell that may be magnetically attached to assets (such as, personnel, construction vehicles, crane booms, forklift forks, etc.) to actively monitor their position, such as, for example, via GPS and report in real-time via an integrated long-range RF transceiver. In operation, the personnel tracking unit 106 may transmit data directly to the base station 108 and/or may transmit data to the vehicle tracking unit 104. In various embodiments, personnel tracking unit 106 may be worn by each worker as well as placed on every piece of moveable machinery and all vehicles entering a worksite. The vehicle tracking unit 104 may be used to collect data from any personnel tracking unit 106 that may be nearby and process this data in real time via a threat estimation engine. The vehicle tracking unit 104 may be utilized to provide a data link between the personnel tracking unit 106 to the base station 108 or other base station. In some embodiments, accidents, warnings, or near misses may be sent to the base station 108 along with video, GPS tracking information, radar tracking information, and other data for storage and off-line analyses.

Still referring to FIG. 1, in various embodiments of the system 100, the vehicle tracking unit 104 may be utilized to lower the risk of any accident at the worksite itself. The vehicle tracking unit 104 may be mounted on the most dangerous systems at the worksite, such as large construction vehicles. It is often necessary to know the precise locations of these vehicles as well as their shape and orientation relative to the worksite. In addition, the vehicle tracking units 104 may serve as a communications node for the personnel tracking units 106. The locations of construction workers having personnel tracking units 106 may be automatically transmitted to the vehicle tracking units 104 when in reasonably close proximity. The vehicle tracking unit 104 will then do the threat estimation and communicate an alert if needed. In this way, power hungry communications and processing can be avoided for those systems relying on battery operation, such as the personnel tracking unit 106. In various embodiments, the vehicle tracking unit 104 may include one or more of the following software modules: a threat estimation engine to examine nearby personnel tracking units 106 to estimate a threat probability based on proximity, path, and speeds, and may include identification of individuals who are required to work in close proximity to specific vehicles; an event management engine to record path and video data for set periods of time and/or record data permanently after an accident or close call event, and send warnings to base station 108, appropriate personnel, and other units; a configuration manager to define vehicle geometry and control parameters such as camera FOV, WiFi connections, cellular connections, etc. and establish allowable personnel for close proximity operations; a BITS and maintenance manager; and/or a playback system. In various embodiments, the vehicle tracking unit 104 may include many of the same components as the vicinity monitoring unit 102 and may also include one or more of the following: INS; LCD monitor showing position and near-vicinity units; power and power management; and/or warning mechanisms (horn, voice, lights).

Figure 2:
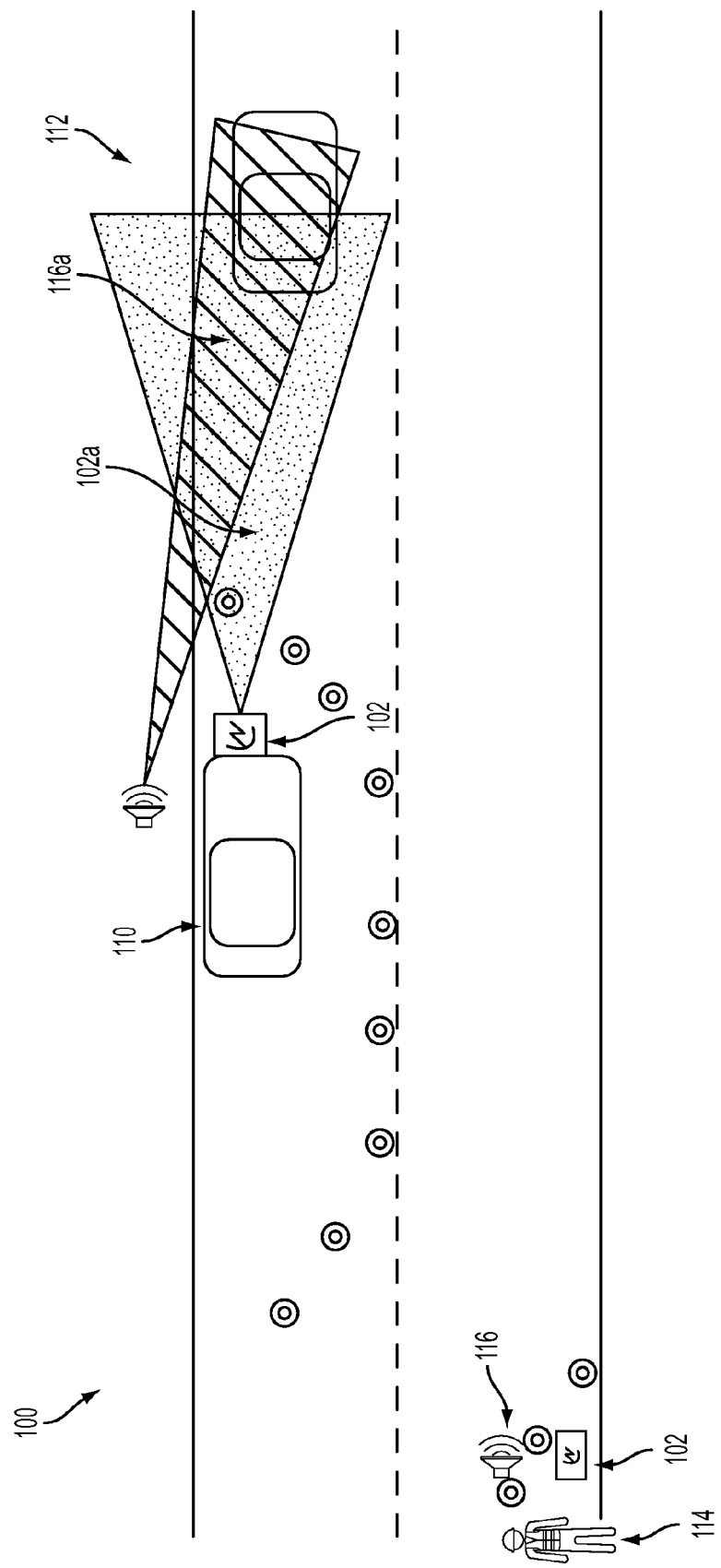
FIG. 2 illustrates an overview of one aspect of the advanced warning and risk evasion system of FIG. 1.

Referring now to FIG. 2, an embodiment of a vicinity monitoring unit 102 of the advance warning system 100 is shown in an exemplary operational scenario. In the embodiment shown, the vicinity monitoring unit 102 includes a radar sensor such as, for example, an electronically scanning radar coupled to a warning device 116 such as, for example, a long-range acoustic device (LRAD). In the embodiment of FIG. 2, two vicinity monitoring units 102 are shown, one mounted to the back of a construction vehicle 110, such as a paint striping vehicle, and one placed near a construction worker 114. The warning devices 116 may be configured to send an alert, such as an audible or visible message to an oncoming vehicle 112 to warn the approaching vehicle of the slow moving construction vehicle 110 and/or the presence of construction worker 114. In some embodiments, a single message may be sent to all oncoming drivers, regardless of driver behavior. In other embodiments, a warning message could be sent only to certain drivers exhibiting hazardous behavior, such as excessive speed. In some embodiments, the system 100 may trigger an audible warning from the warning device 116 when the oncoming vehicle 112 crosses a specified velocity or distance threshold. In some embodiments, the vicinity monitoring unit 102 may include a control device for interfacing with the radar and controlling the warning device 116. In such embodiments, the risk evasion system 100 may be utilized to warn only those drivers exhibiting dangerous behaviors and tailoring the warning to those behaviors, resulting in a more effective warning that is less intrusive to the general public. In various embodiments, the vicinity monitoring unit 102 may be operated as a stand-alone warning system, for example, a single vicinity monitoring unit 102 mounted to a moving vehicle, or may be operated as part of larger system where one or more vicinity monitoring units 102 may be disposed at various locations and in communication with each other and/or with other sub-components of the advance warning system 100. In various embodiments, the vicinity monitoring unit 102 may be capable of providing one or more of the following functionality: collision warning, pre-crash sensing, auto-brake support (triggering external devices), and radar/camera sensor fusion; and multiple target discrimination in range, range rate, and angle for best performance in dense multi-object scenarios.

Major subcomponents of the vicinity monitoring unit 102 include the radar and the warning device 116, such as, for example, an LRAD acoustic warning system. In various embodiments, the warning device 116 would only be triggered when a collision is imminent. The radar of the vicinity monitoring unit 102 has a field of view 102a that may be configurable to monitor a user-selected area, such as the space adjacent to or directly behind construction vehicle 110. In various embodiments, the warning device 116 may be configured to send directional warnings 116a to vehicles 112 approaching a protected area. In various embodiments, the warning device 116 may be an LRAD capable of providing an audible directional warning 116a to oncoming hazards over 3000 meters away, given line of site. In operation, the LRAD focuses acoustic energy into a very tight beam and specialized drivers allow for high acoustic energy without distortion. In various embodiments, the LRAD (such as for example, the LRAD 1000X) focused on an oncoming vehicle 112 85 meters away may be able to deliver an audible siren with the windows up, stereo on, air-conditioner running, and other the background noise present. In a preferred embodiment, the sound would be alerting, but not startling or intolerable, and, thereafter, a verbal command would issue that would be clearly decipherable over the din. Such an audible warning may provide an effective countermeasure, enabling prevention of accidents before they even happen. In a preferred embodiment, the warning would be loud enough to be heard and not ignored, without disrupting work within the worksite or too far beyond the offending vehicle.

In various embodiments, the vicinity monitoring unit 102 may include one or more of the following: a radar, such as a Delphi ESR radar; a warning device 116, such as an LRAD system; a video camera; local communication systems, such as WiFi, Bluetooth, and/or Zigbee, to provide communications to other components of the system 100 in the near vicinity; long-haul communication systems, such as cellular, radio, or other; a GPS or differential GPS system for proper integration with setup planning tools and base station 108; accelerometers; tamper monitoring devices; and/or batteries or other power supplies and power management systems. In some embodiments, the vicinity monitoring unit 102 may be in communication with a smaller warning device, such as a handheld LRAD device that could be carried and/or placed in front of a work station, such as the flagger in a work zone.

In various embodiments, the vicinity monitoring unit 102 may be configurable to perform many functions. For example, the vicinity monitoring unit 102 may detect and track vehicles, such as vehicle 112, approaching a worksite, record relevant data and communicate the data back to the base station 108, monitor the internal health of the unit 102, and/or communicate with other vicinity monitoring units to assist in proper setup. In some embodiments, the software modules performing one or more of these tasks may include: a threat estimation engine to examine tracks developed by radar and estimate threat probability based on actual versus ideal path locations and speeds; an event management engine to record all radar and video data for a set period of time and record all data permanently; give accident or close call event and send warnings to a management unit, appropriate personnel, and other units; a configuration manager to control parameters (if any) such as radar/camera FOV, WiFi connections, cellular plan, etc.; a BITS and maintenance manager; a setup planning and assistance tool to display a map of a site, assist in simulation of threat parameters to be adjusted (max speed, level of path deviation for threat, etc.), and analysis of data collected and any real-world tests run, such as driving a "test car" with GPS through a work zone on a predetermined path at predetermined speeds.

Figure 3:
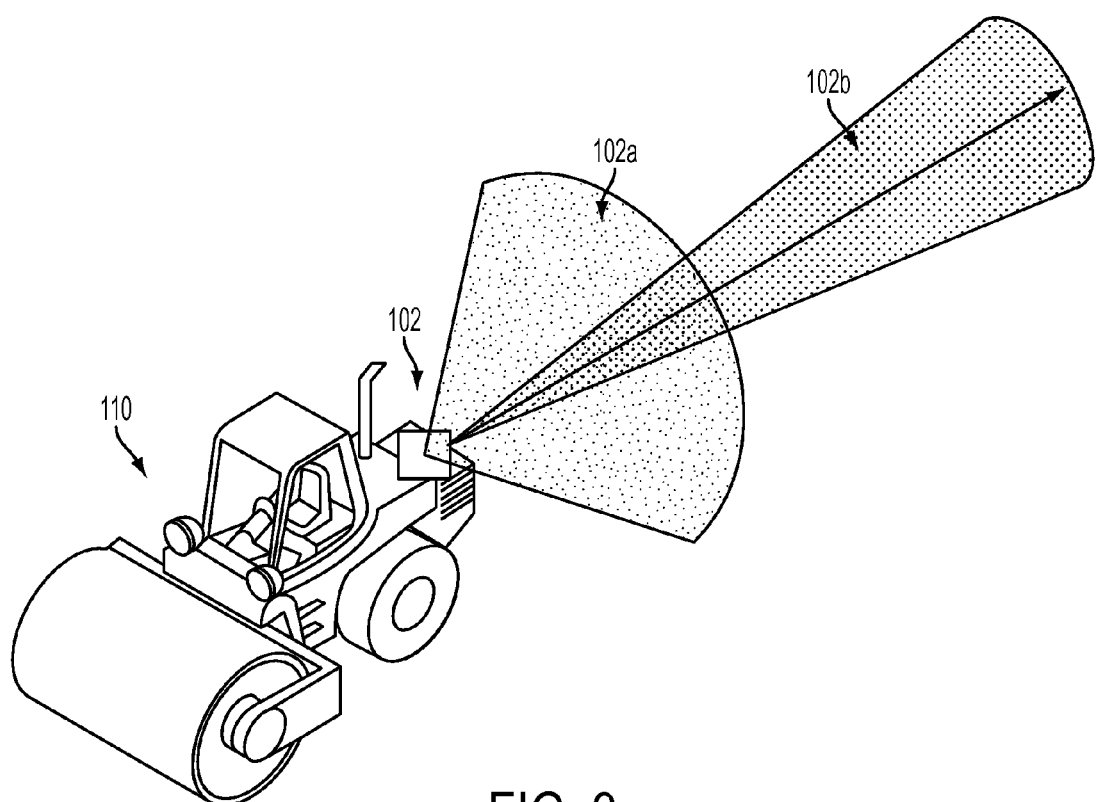
FIG. 3 illustrates a perspective view of a construction vehicle having short-range and long-range radar fields in a rearward direction.

Referring now to FIG. 3, a construction vehicle 110 is shown having a vicinity monitoring unit 102 mounted thereon. In various embodiments, the radar utilized in the vicinity monitoring unit 102 to monitor traffic flow may be the Delphi ESR RADAR, as it is currently being used by several automotive manufacturers in applications such as adaptive cruise control and parking assist. In the embodiment shown, the radar sensor of the vicinity monitoring unit 102 may be configured to provide dual detection zones, a close range FOV 102a and a far range FOV 102b. In some embodiments, the close range FOV 102a may include a field of view of approximately plus or minus 45 degrees up to a distance of approximately 60 meters and the far range FOV may include a field of view of approximately plus or minus 10 degrees up to a distance of approximately 174 meters.

In various embodiments, the vicinity monitoring unit 102 may need to be calibrated after being mounted to construction vehicle 110. In some embodiments, the vicinity monitoring unit 102 may be configured to allow a one-step calibration process. In such embodiments, after being mounted to the construction vehicle 110, a calibration unit (not shown) may be placed in the field of view 102a of the vicinity monitoring unit 102. In some embodiments, the calibration unit may be a personnel monitoring unit having a radar reflected coupled therewith. After being mounted, the position of the GPS antennae of the vicinity monitoring unit 102 may be measured. After the antennae have been measured, a installation technician may place the calibration unit in the field of view 102a, such as, for example, by mounting the calibration unit onto a tripod and placing it anywhere in the field of view 102a. The calibration must take place outdoors so that the GPS antennae have a clear view of the sky. The calibration unit transmits its GPS position, for example, via radio, to the vicinity monitoring unit 102 being calibrated. The vicinity monitoring unit 102 then compares the measurements from its own DGPS set to the calibration unit's GPS position and calibrates that to the measurements being received by the sensor from the reflector. Using these data points the system can determine the exact orientation of the field of view 102a of the sensor relative to the DGPS system. In various embodiments, the technician may perform this procedure at several points within the sensor's field of view 102a to improve accuracy and the vicinity monitoring unit 102 may store these measurements as calibration constants.

Figure 4:
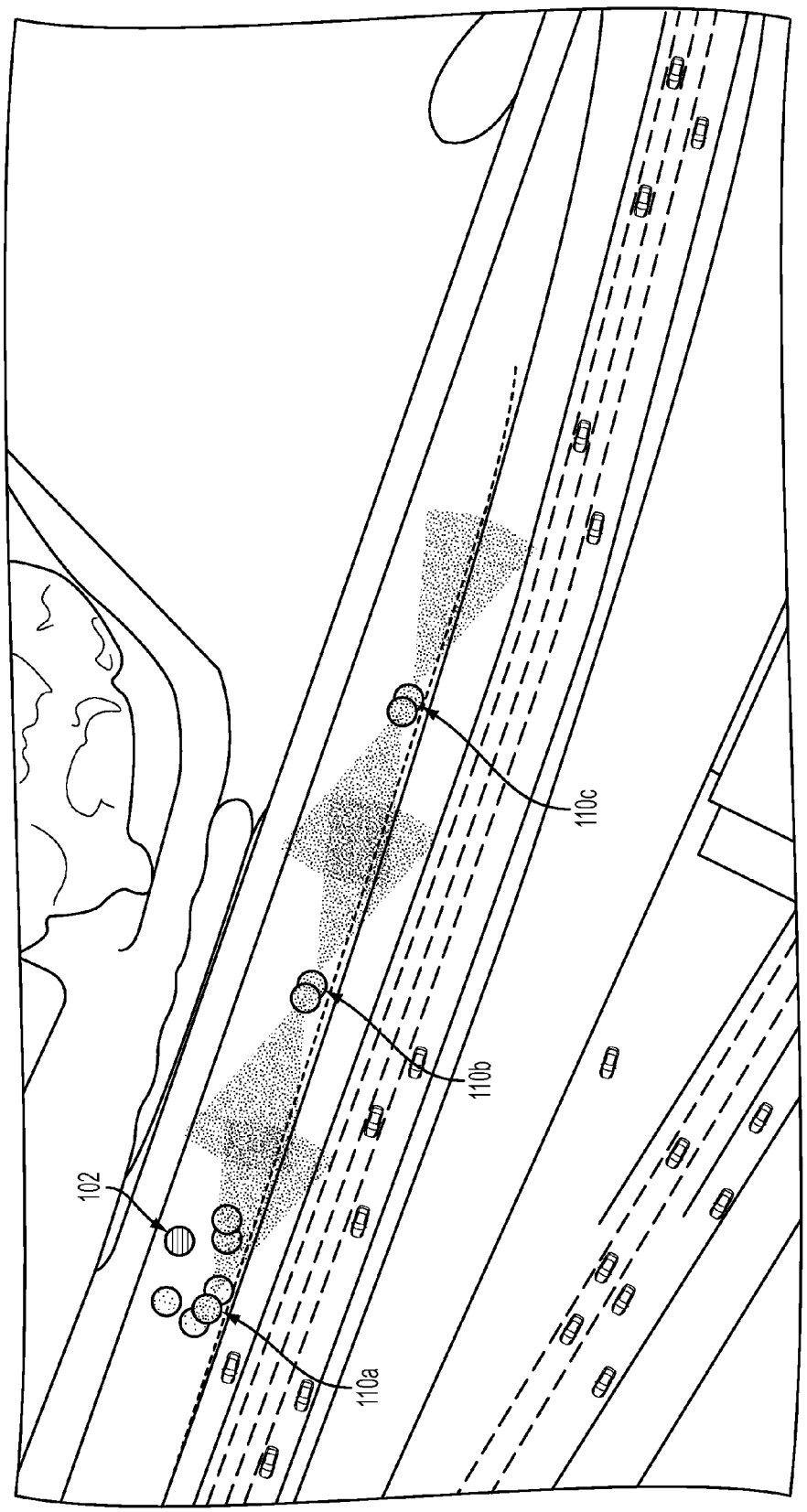
FIG. 4 illustrates an overview of an alternative embodiment of the advanced warning and risk evasion system of FIG. 1.

Referring now to FIG. 4, an overview of a construction site adjacent to a roadway is shown. In the embodiment shown, the construction site includes a first construction vehicle 110a, such as a paver, followed by a second construction vehicle 110b, such as a roller, followed by a third construction vehicle 110c, such as a sweeper. In various embodiments, the first construction vehicle 110a may have a vicinity monitoring unit mounted thereon with a rearward facing field of view. The second construction vehicle 110b may have two vicinity monitoring units mounted thereon, a first forward facing unit and a second rearward facing unit. The third construction vehicle 110c may have two vicinity monitoring units mounted thereon, first forward facing unit and a second rearward facing unit. In such an embodiment, each of the vicinity monitoring units could be configured to monitor oncoming traffic and construction vehicles in close proximity thereto. In the embodiment shown, each construction vehicle 110a-c may include a vicinity monitoring unit and/or may include a vehicle monitoring unit. In some embodiments, construction workers may be wearing personnel monitoring units in communication with one or more of the vicinity monitoring units, the vehicle monitoring units, and/or a base station 108. In operation, the vicinity monitoring units may be configured to transmit a warning message if a hazardous condition arises, such as, for example, a vehicle in oncoming traffic crosses into a safe zone (shown as a dashed line); a vehicle in oncoming traffic is approaching at an unsafe speed or direction, a nearby construction vehicle is getting too close; and/or personnel are at an unsafe location. In some embodiments, the warning message may include audible and/or visual signals being sent to the oncoming traffic, a warning being sent to the operator of the construction vehicle, a warning being sent to the base station 108 and/or construction workers wearing personnel monitoring units.

Figure 5A:
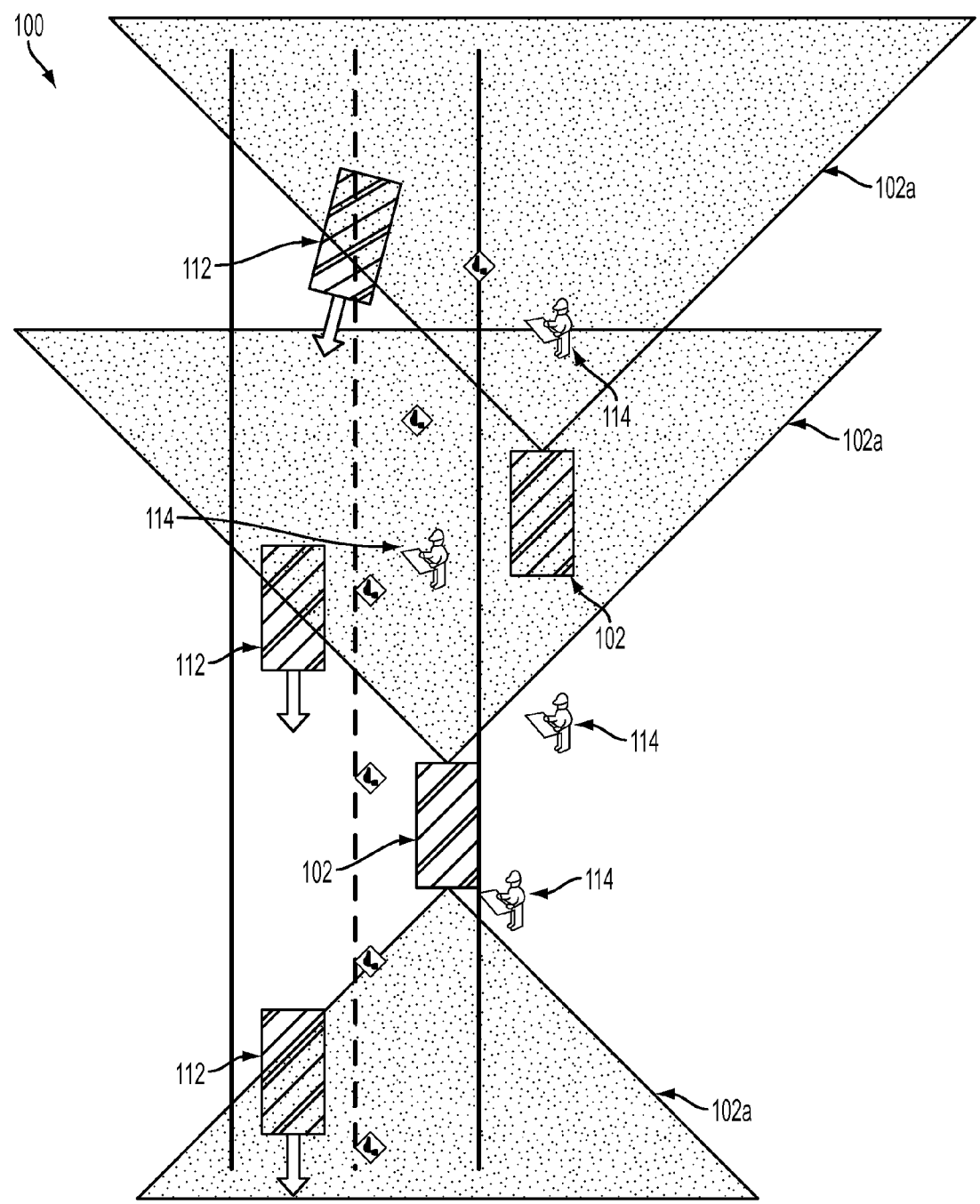
FIG. 5A illustrates an overhead view of another embodiment of an advanced warning and risk evasion system at a first point in time.
Figure 5B:
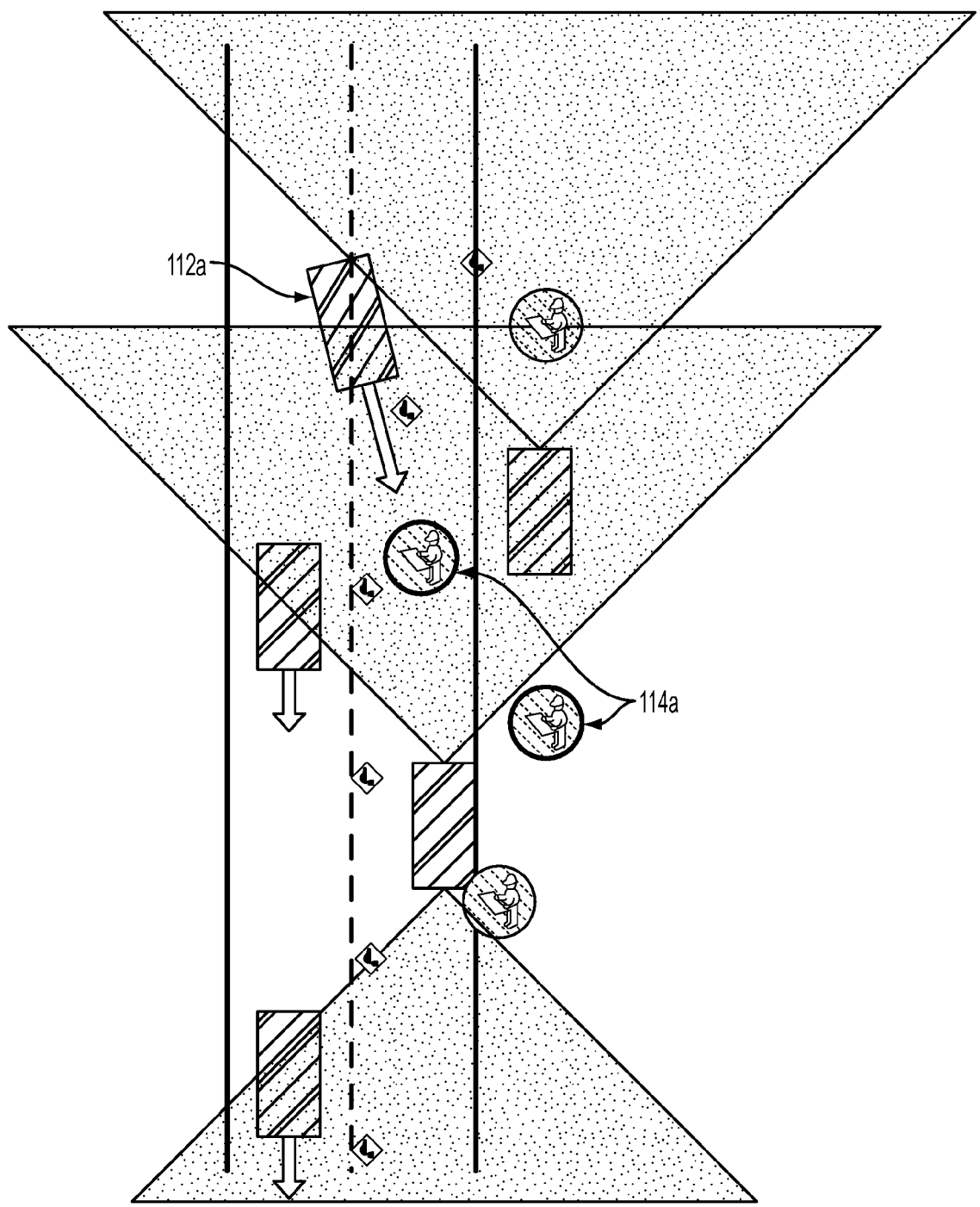
FIG. 5B illustrates the embodiment of an advanced warning and risk evasion system of FIG. 5A at a second point in time.

Referring now to FIGS. 5A and 5B, an overview of an embodiment of the risk evasion system 100 is shown. In the embodiment shown, construction workers 114 are working in a construction zone adjacent to a roadway having vehicles 112 travelling thereon. In various embodiments, the system may incorporate traffic control devices, such as mobile safety barriers or other physical blockades (shown in FIGS. 5A and 5B as a plurality of square flags between the construction zone and the roadway) to further improve safety. In the embodiment shown, vicinity monitoring units 102 have been disposed in the construction zone, where the units 102 have fields of view 102a configured to monitor oncoming traffic and the locations of the construction workers 114. In some embodiments, the locations of the construction workers 114 may be monitored either by radar, video, motion, pressure, magnetic sensors, personnel tracking units (if being worn), or some combination thereof. Referring now specifically to FIG. 5B, the vicinity monitoring units 102 are monitoring the path of oncoming vehicle 112a and have detected that the oncoming vehicle 112a is travelling on a path towards the construction zone. In various embodiments, upon detecting a potentially hazardous situation, the vicinity monitoring units 102 may send a warning signal to the oncoming vehicle 112a to alert the driver to change course and/or may send a signal to the construction workers 114a located in the path of the oncoming vehicle 112a either by sending an audible and/or visual warning signal to the construction workers 114a and/or transmitting a signal to their personnel tracking units. As explained in more detail below, in some embodiments, the personnel tracking units worn by the construction workers may include warning devices such that, when a hazard is detected from within the site or otherwise, the individual at risk may receive a customized warning such as "STOP," or "TAKE COVER." The warning may be clear, timely, and with very low false alarms to ensure the worker reacts in time to find safety.

Figure 6A:
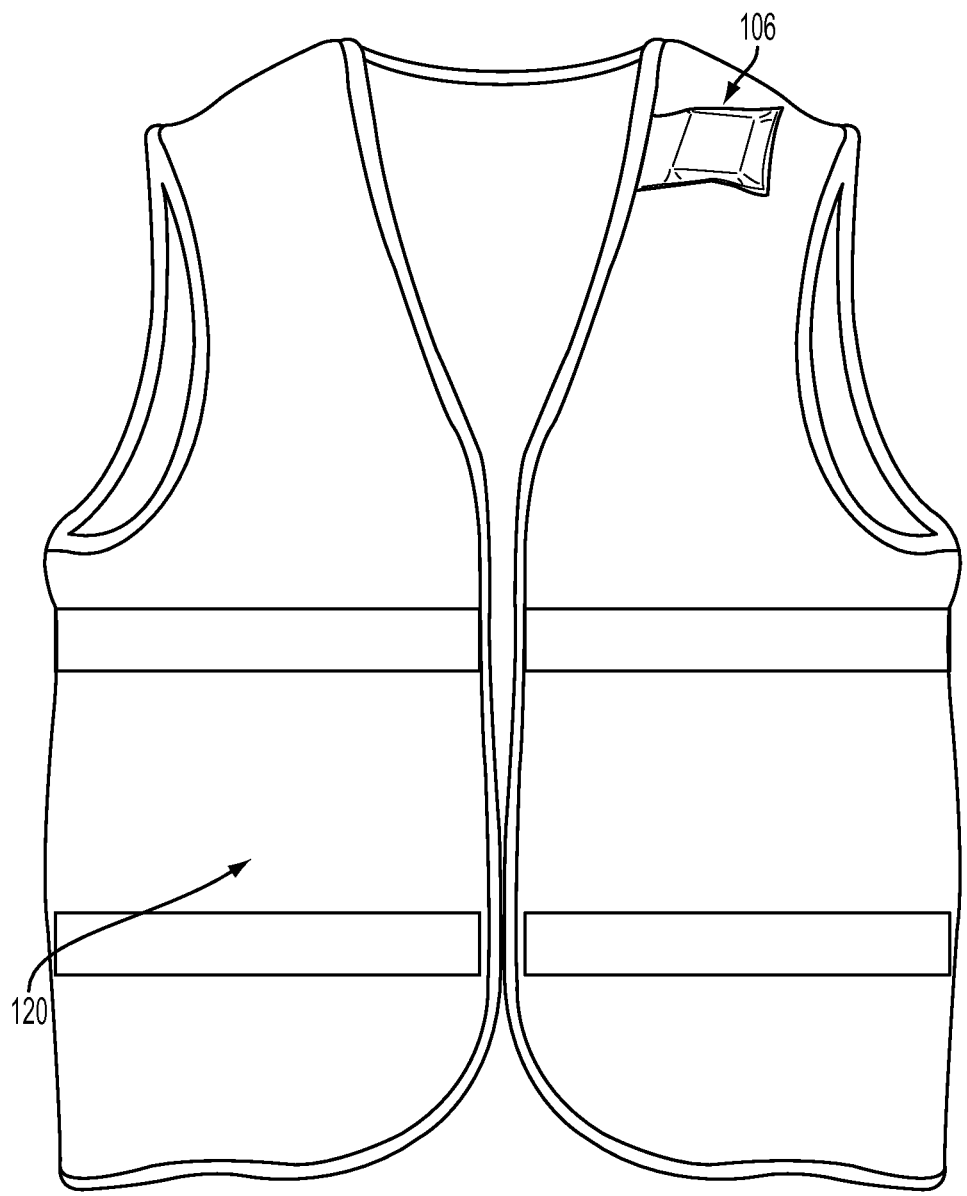
FIG. 6A illustrates a safety vest having a personnel monitoring device incorporated therein.
Figure 6B:
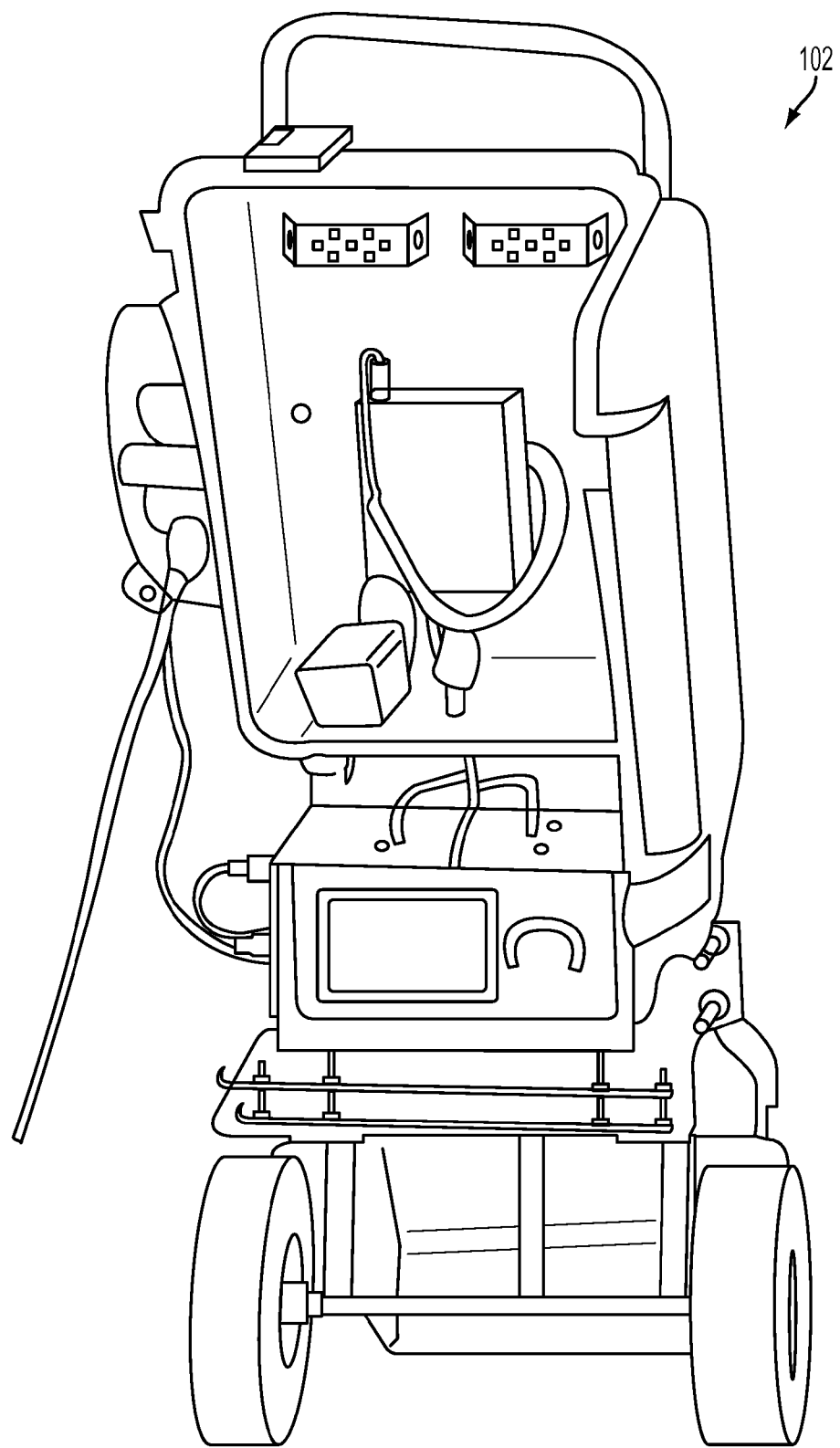
FIG. 6B illustrates an embodiment of a mobile monitoring station.

Referring now to FIG. 6A, a personnel tracking unit 106 is shown integrated into a safety vest 120 that may be worn by a construction worker. In various embodiments, the personnel tracking unit 106 may be integrated into other devices, such as a hardhat, a handheld device, a clip-on device, a protective enclosure, and/or other enclosures. The personnel tracking unit 106 may be a simpler, lower power and lower cost device than, for example, the vehicle tracking unit. The personnel tracking unit 106 may track the position of the construction worker and then transmit this information to nearby vehicle tracking units, vicinity monitoring units, and/or a base station. The personnel tracking unit 106 may include local communication functionality to provide communications onsite to other units/personnel in the near vicinity; may include a tracking system for visiting personnel and/or vehicles; may include BITS and maintenance manager; power management that may record time since a last battery charge; configuration tools; and/or a site exit warning to prevent theft or accidental site removal. In various embodiments, the personnel tracking unit 106 may include, for example, vibration capabilities, audible indicators, and/or visual indicators that may be configurable to warn the construction worker of a hazardous situation. Referring now to FIG. 6B, an embodiment of a transportable vicinity monitoring unit 102 is shown that may be utilized in conjunction with a plurality of personnel tracking units 106. In operation, the transportable vicinity monitoring unit 102 may be disposed in proximity to one or more construction workers wearing personnel tracking units 106 at a construction site, such as, for example, a flagger station adjacent a roadway. In various embodiments, a plurality of personnel tracking units 106 may communicate directly with the transportable vicinity monitoring unit 102 which may be configured to communicate with, for example, a base station, other vicinity monitoring units, and/or vehicle tracking units.

Figure 7:
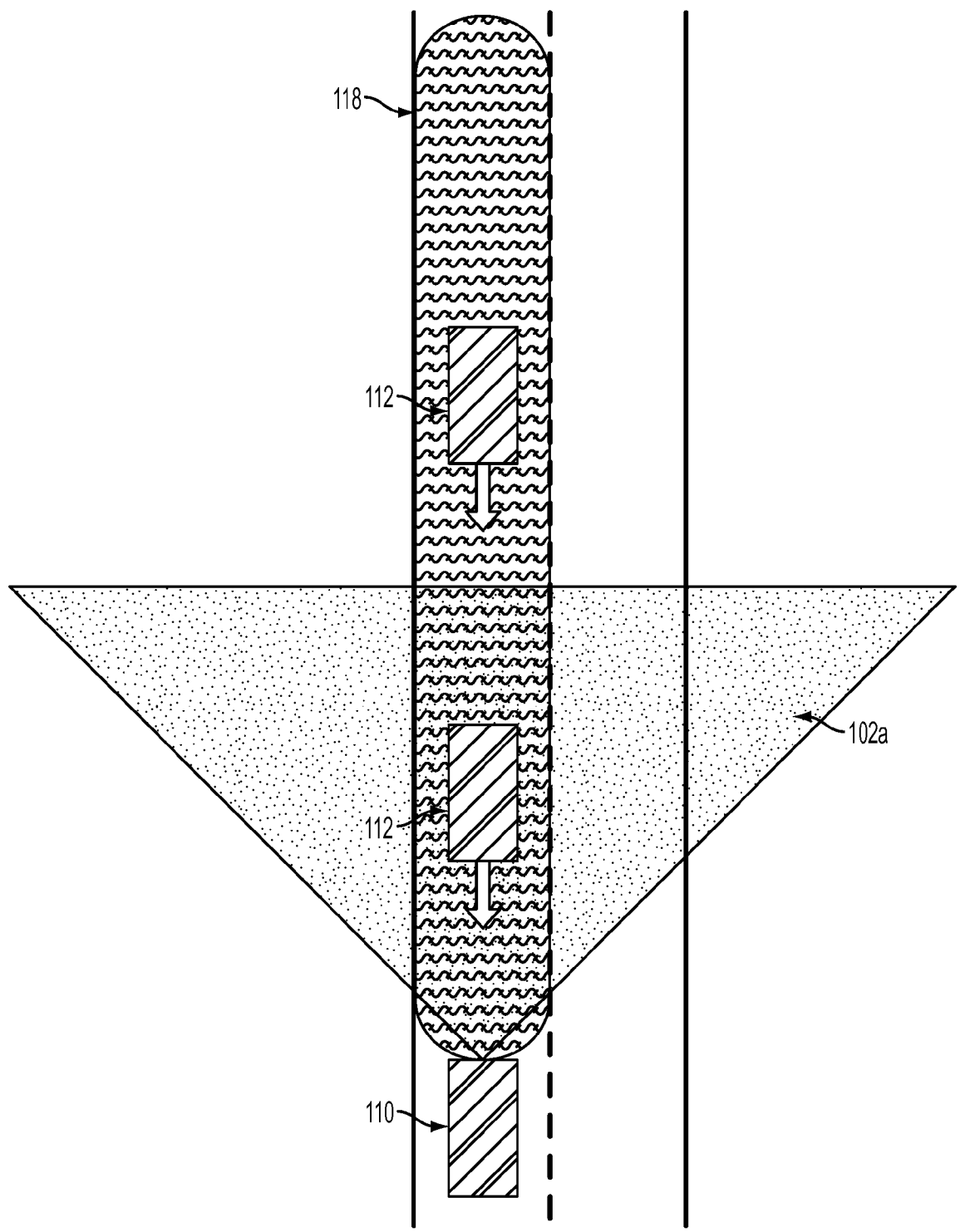
FIG. 7 illustrates an overhead view of another aspect of an embodiment of an advanced warning and risk evasion system.

Referring now to FIG. 7, a construction vehicle 110, such as, a paint striping vehicle, is shown travelling along a roadway with oncoming traffic 112 travelling behind the construction vehicle 110. The construction vehicle has a vicinity monitoring unit disposed thereon with a rearward facing field of view 102a. In some embodiments, the vicinity monitoring unit may be configured to create a protected area 118 by combining data from one or more sources including GPS, radar, and optical sensors to build a probability map of where the protected area 118 should be located. If a vehicle 112 enters the protected area 118, the vicinity monitoring unit applies a stopping distance equation and triggers a warning signal if the oncoming vehicle 112 approaches the construction vehicle 110 too fast or too close.

Figure 8:
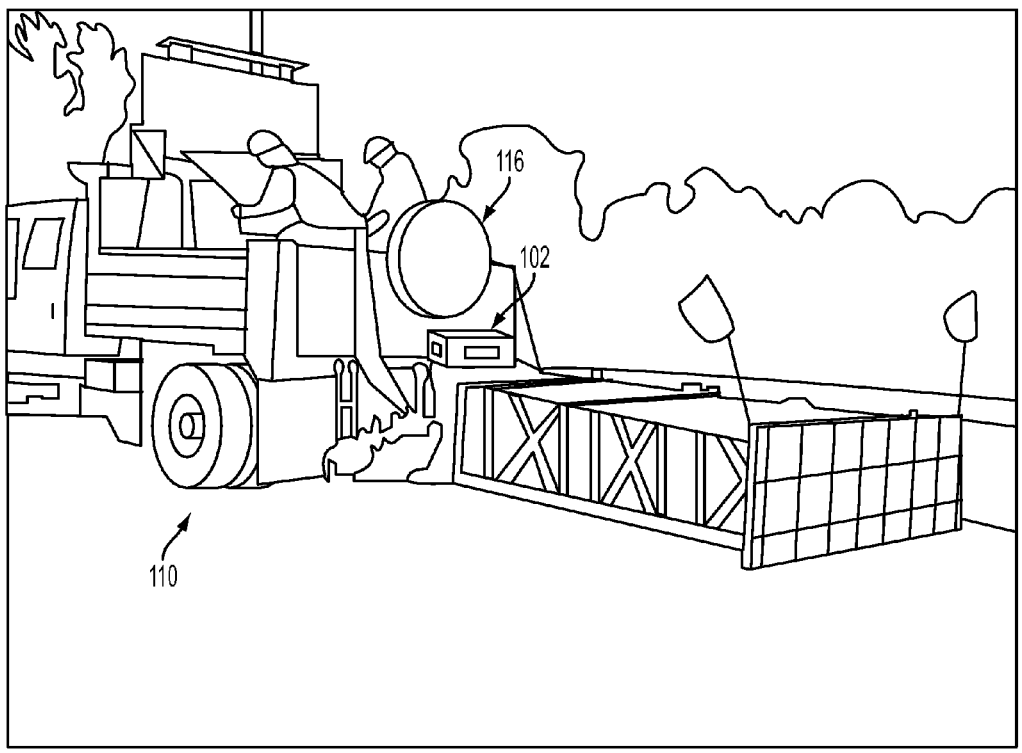
FIG. 8 is a perspective view of a construction vehicle having a radar and warning device mounted thereon.

Referring now to FIG. 8, a construction vehicle 110, such as a paint striping vehicle, is shown having a vicinity monitoring unit 102 and a warning device 116 mounted thereon in a rearward facing direction. In various embodiments, the vicinity monitoring unit 102 may be configured to send an audible or visual warning signal to the vehicle if a vehicle enters a protected area (such as 118 in FIG. 7). In some embodiments, the vicinity monitoring unit 102 may be configured to transmit data to a base station to allow construction site managers to monitor information in real-time or at a later time. The base station may include a map display of all personnel, vehicles, and local traffic. In various embodiments, aspects and functionality of various devices described herein may be included in one or more other devices, such as, for example, a base station may be incorporated into a vicinity monitoring unit or vice versa. Any warnings or near misses may be sent to the base station along with video, GPS tracks, radar tracks, and other data for real-time viewing and/or storage and later analyses. In addition, the base station may be equipped with software tools for analyzing safety situations and sensor placement to determine if the site is set up correctly; all vehicles are communicating their positions; any personnel in inherently dangerous locations, etc.

Figure 9A:
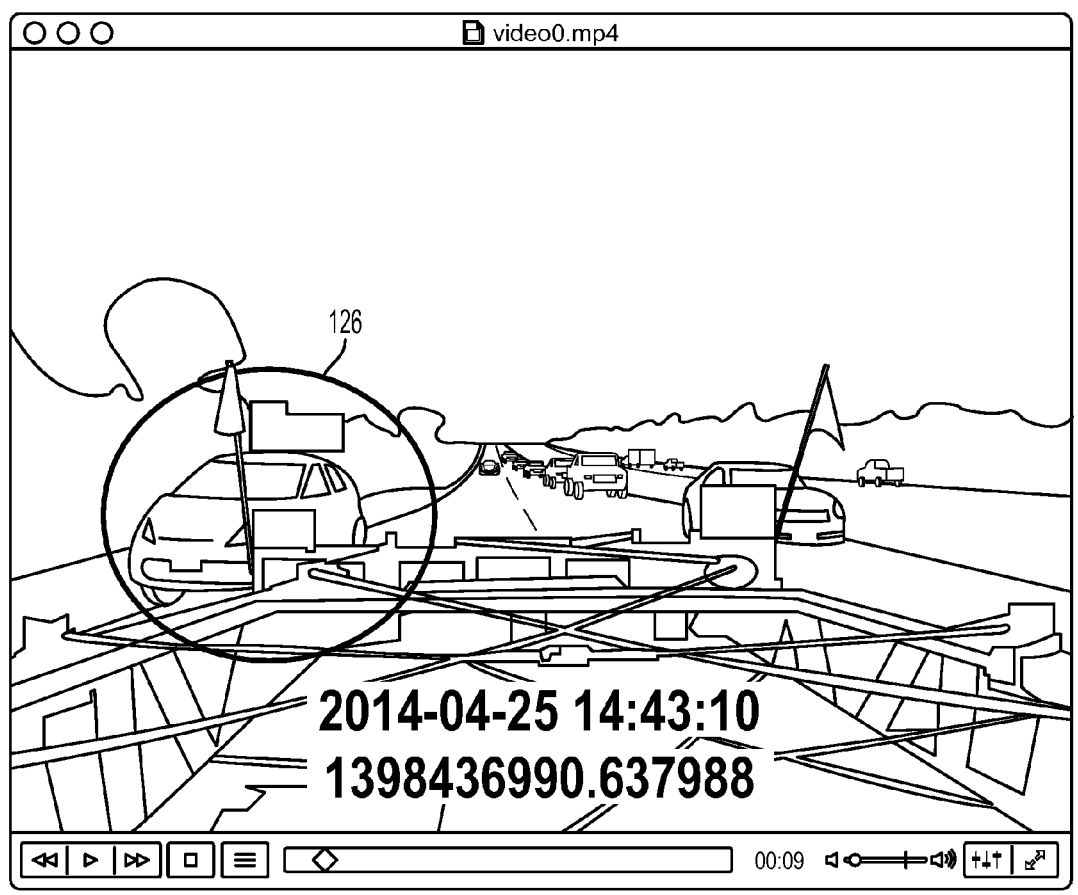
FIG. 9A is a screen shot of a video recorded from a rear facing camera mounted to the construction vehicle of FIG. 8.

Referring now to FIG. 9A, a screenshot captured from a camera disposed within the vicinity monitoring unit 102 of FIG. 8 is shown. In some embodiments, the video may be viewable on a monitor disposed inside the construction vehicle 110, may be saved by the vicinity monitoring unit 102 for later viewing, or may be relayed to a base station for monitoring either in real-time or at a later time. In the embodiment shown in FIG. 9A, a hazardous situation (identified by circle 126) has been detected by a vehicle entering a protected area. The hazardous situation 126 may be caused by the vehicle being too close to the construction vehicle, approaching the construction vehicle at too high of a velocity, or exhibiting erratic behavior such as driving on the shoulder of the roadway.

Figure 9B:
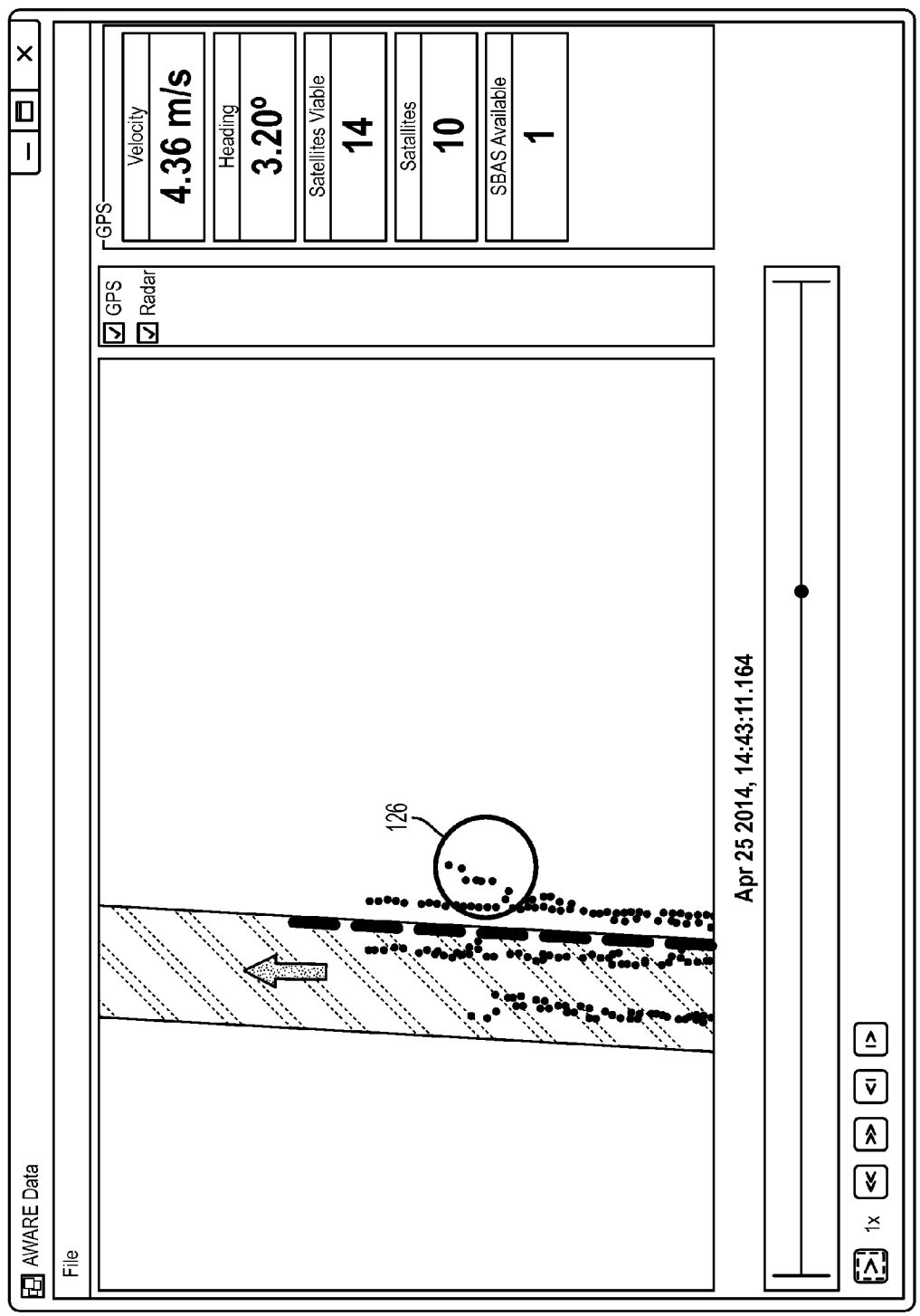
FIG. 9B is a screen shot of data corresponding to the video of FIG. 9B.

Referring now to FIG. 9B, a screenshot of data being displayed at, for example, a base station is shown. The base station provides a map display enabling site management to monitor all movement and view any hazardous situations detected along with backup data permitting post analysis. In the embodiment shown, data collected by the vicinity monitoring unit 102 of FIG. 8 is being played back, which may be correlated to the captured video, such as, for example, shown in FIG. 9A. The dashes shown in the figure may be GPS position measurements made by the vicinity monitoring unit 102. The dots shown in the figure may be radar returns from vehicles as they pass the vicinity monitoring unit 102. In particular, the dots located within the hazardous situation (identified by circle 126) correspond to the vehicle swerving to the right of the construction vehicle, for example, as shown in FIG. 9A.

Figure 10:
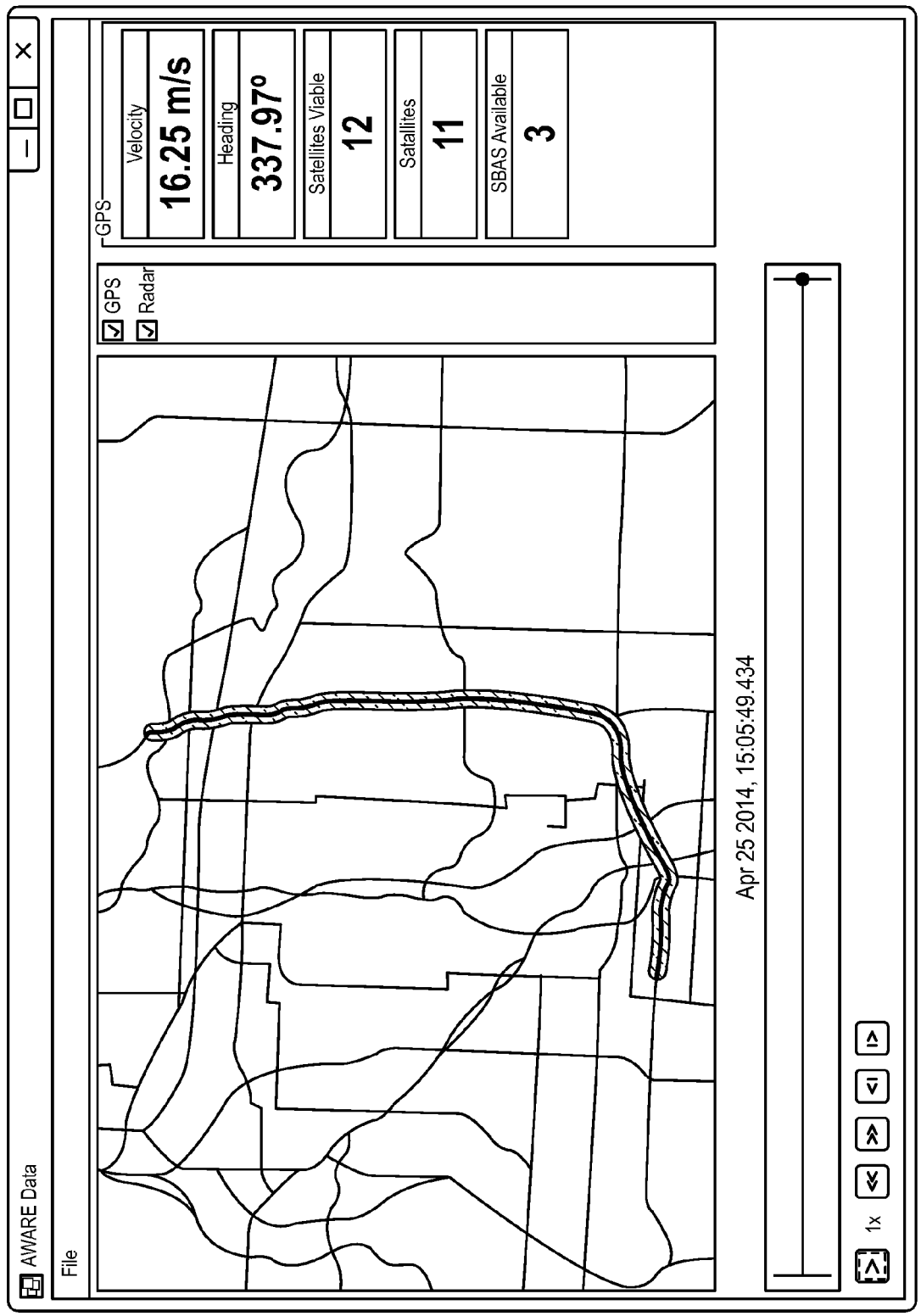
FIG. 10 is a screen shot of data recorded by an embodiment of an advanced warning and risk evasion system.
Figure 11:
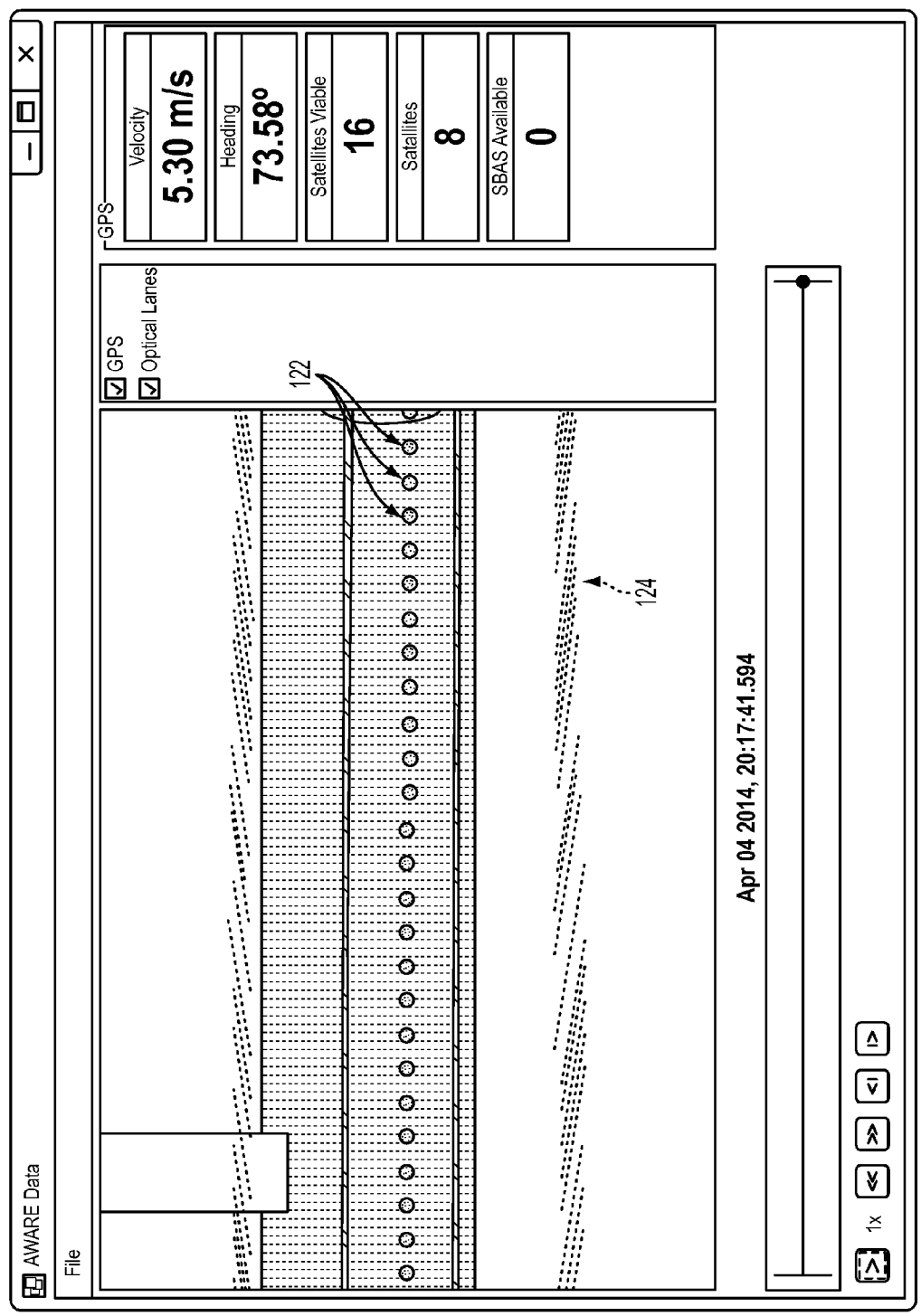
FIG. 11 is a screen shot of data recorded by an embodiment of an advanced warning and risk evasion system.

Referring now to FIG. 10, a screenshot of a zoomed out view of the data collected from the vicinity monitoring unit 102 of FIG. 8 is shown. The data has been overlaid on a map for reference purposes. Referring now to FIG. 11, a screenshot of a zoomed in view of route data is shown. In the screenshot, GPS measurements 122 are shown as dots and optical measurements of an estimated lane position 124 are shown as hash marks. In addition to the functions mentioned above, including real time monitoring of a construction site and playback of past data for review and analysis, in various embodiments, the base station may perform higher level tasks such as examining site operations for systemic situations known to result in higher accident rates. Software modules may include one or more of the following: site map display; warning alert locator; and conditional event monitor (e.g. establish "pre-warning" conditions warranting increased monitoring).

Another aspect of the present invention involves methods for determining the selection and placement of radar sensors around a potentially hazardous location and the triggering criteria for when warnings should be activated. Using accident data, a computer simulation may be made of actual scenarios as well as other possible scenarios derived from the data to allow scenarios to be recreated and "played through" to find points at which a countermeasure could be applied in order to prevent an accident. An event simulator based on past events may be employed to accurately describe each event scenario and allow the scenario to be repeated in the computer. Additionally, it may also be possible to add other stimuli to the simulation to quantify their effect on the situation. Performance characteristics of the one or more sensors may be added to the simulation as well as proposed countermeasures so that effectiveness in a variety of scenarios may be measured. The output of the simulations may include a statistical estimate of the strengths and weaknesses of each approach.

Simulations may be run in many different scenarios to allow for good statistical confidence of detecting imminent danger. Many different roadway factors may be measured such as, for example, velocity changes and rate; lane wandering; following distances; velocity vector; horn honking, tire squealing; sun angle, fog, smoke, wind, dust, rain, snow, and ice. A variety of sensors and computer algorithms may be utilized to detect events such as, for example, human foot traffic; 6-axis acceleration; geo-location using GPS satellites; threat detection using radar and optical sensors; pyrotechnic shock; heat, humidity, and pressure; as well as many variants of these in numerous applications. Sensor installation as well as ease of use may also be evaluated based on performance criteria, including: time to setup and install; required calibration; false alarm rate; maintenance and need for local monitoring; and required end-user training. The simulation may also evaluate how quickly the warning can be processed and transmitted to those in danger. Human reaction time and distance required to escape may be used to influence the results of each simulation. In some embodiments, the advance warning and risk evasion system may include software integrated with the system that automatically surveys a site and optimizes the placement of sensors, warning devices, and barriers based on traffic patterns.

With the problem defined and causal factors better understood, a sensor or suite of sensors may be selected to detect the potential hazards and audible and visual warning devices may be selected to provide alerts of a potential hazard. In various embodiments, performance characteristics of various potential technology and arrangements may be entered into the simulation model. The model may be varied as necessary to allow each mitigating technology to appropriately modify the outcome based on its performance data. For example, the manufacturer specifications for a certain optical sensor, such as, for example, its field of view, sensing distance, and/or image resolution, may be utilized when establishing an initial location within a scenario, whether a test scenario or real-life scenario. Thereafter, the specifications may be varied and the location further optimized as measurements of its actual performance are taken. If the required detection cannot be achieved, or the sensor is affected too heavily by environmental factors, a different device may be required. Any number of sensing devices and orientations may be tested in this virtual environment without having to acquire the device and physically evaluate it in the field. Additionally, data from actual usage can provide feedback to continually refine the system. The modified event simulator with proposed sensor performance data will enable an analysis of system performance.

In one embodiment, data from the radar is captured as a vehicle approaches and is saved into memory for later processing, as well as used to monitor the speed and range of each approaching vehicle. Saved data can be used to make the system more effective and/or for accident reconstruction in the event an accident occurs at the construction site. The saved data can be analyzed to establish and or modify a threshold for velocity and range at which the risk evasion system may trigger the warning device, such as an LRAD unit, and send an appropriate message to the driver. In some embodiments, the radar may communicate via CAN Bus, which is a standard communication protocol commonly found in automotive applications. A control device, such as a Digilent board with a CAN Bus module, can be used to communicate with the radar as well as make the decision for when to trigger the warning device, such as an LRAD.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit and scope of the invention.

What is claimed is:

1. An advanced warning and risk evasion system comprising: a vicinity monitoring unit having a sensor and a processor, wherein the sensor comprises a transmitter and a receiver configured to detect an object located in the sensor's field of view and changes in the object's position relative to the sensor, and the processor is configured to calculate the vicinity monitoring unit's position, orientation, and velocity and to detect a hazardous situation based at least in part on the object's speed and direction of travel relative to the vicinity monitoring unit; a calibration unit configured to calculate the calibration unit's location and transmit location information to the vicinity monitoring unit; wherein the processor is configured to determine an orientation of the field of view of the sensor based at least in part on the location information received from the calibration unit; and wherein the vicinity monitoring unit is configured to be coupled to a warning device to transmit a warning signal to the object upon detection of the hazardous situation.

2. The advanced warning and risk evasion system of claim 1, wherein the warning device is a long range acoustical device capable of sending a directional acoustic beam at the object.

3. The advanced warning and risk evasion system of claim 1, wherein the vicinity monitoring unit is configured to allow one or more warning signals to be transmitted to the object, the one or more warning signals being selected by the processor based at least in part on characteristics of the hazardous situation detected.

4. The advanced warning and risk evasion system of claim 1, wherein the calibration unit utilizes GPS to calculate the calibration unit's location and the vicinity monitoring unit utilizes DGPS to calculate the vicinity monitoring unit's position.

5. The advanced warning and risk evasion system of claim 1, wherein the calibration unit includes a reflector; and
wherein the vicinity monitoring unit is configured to correlate the location information received from the calibration unit with information from the sensor relative to the reflector's location.

6. The advanced warning and risk evasion system of claim 1, wherein the vicinity monitoring unit is configured to be mounted to a construction vehicle and monitor an area adjacent to the construction vehicle.

7. The advanced warning and risk evasion system of claim 6, wherein the vicinity monitoring unit is configured to remain calibrated after the calibration unit has been removed from the sensor's field of view and after the construction vehicle has changed positions.

8. The advanced warning and risk evasion system of claim 1 and further comprising:
a tracking unit configured to calculate the tracking unit's position and transmit position information to the vicinity monitoring unit; and
wherein the processor is configured to detect an unsafe situation based at least in part on the position information received from the tracking unit.

9. The advanced warning and risk evasion system of claim 1, wherein the vicinity monitoring unit is configured to be mounted onto a moveable cart.

10. An advanced warning and risk evasion system comprising: a vicinity monitoring unit having a radar and a processor, wherein the radar is configured to detect an object located in the radar's field of view and changes in the object's position relative to the radar, and the processor is configured to calculate the vicinity monitoring unit's position, orientation, and velocity and to detect a hazardous situation based at least in part on the object's speed and direction of travel relative to the vicinity monitoring unit; a calibration unit configured to calculate the calibration unit's location and transmit location information to the vicinity monitoring unit; wherein the processor is configured to determine an orientation of the field of view of the radar based at least in part on the location information received from the calibration unit; and a warning device coupled to the vicinity monitoring unit and configured to transmit a warning signal to the object upon detection of the hazardous situation.

11. The advanced warning and risk evasion system of claim 10, wherein the warning device is a long range acoustical device capable of sending a directional acoustic beam at the object.

12. The advanced warning and risk evasion system of claim 10, wherein the vicinity monitoring unit is configured to correlate the location information received from the calibration unit with information from the radar relative to the calibration unit's location.

13. The advanced warning and risk evasion system of claim 10, wherein the vicinity monitoring unit is configured to allow a hazardous situation to be defined by an occurrence of one or more of the following: a speed of the object exceeding a threshold speed and a direction of travel of the object being towards the vicinity monitoring unit.

14. The advanced warning and risk evasion system of claim 10, wherein the vicinity monitoring device is capable of being mounted onto a construction vehicle and configured to allow an area near the construction vehicle to be monitored for unsafe conditions.

15. The advanced warning and risk evasion system of claim 10 and further comprising:

a first tracking unit configured to calculate the first tracking unit's location and transmit location information to the vicinity monitoring unit; and wherein the processor is configured to detect an unsafe situation based at least in part on the location information received from the first tracking unit.

16. The advanced warning and risk evasion system of claim 15 and further comprising:

a second tracking unit configured to calculate the second tracking unit's location and transmit location information to the first tracking unit.

17. The advanced warning and risk evasion system of claim 10 and further comprising:

a base station in communication with the vicinity monitoring unit, wherein the vicinity monitoring device is configured to transmit information to the base station in real time; and a display coupled to the base station configured to allow a user to view at least some of the information transmitted by the vicinity monitoring unit.

18. An advance warning and risk evasion method comprising: providing a vicinity monitoring unit having a radar and a processor, the processor being configured to allow the vicinity monitoring unit to be mounted to a utility vehicle; calculating a location of the vicinity monitoring unit utilizing GPS; placing a calibration unit in the radar's field of view, the calibration unit configured to calculate the calibration unit's location utilizing GPS; determining a position of the calibration unit based on information received from the radar; receiving location information from the calibration unit; and calibrating the vicinity monitoring unit by correlating the location information received from the calibration unit with the position of the calibration unit determined based on information received from the radar.

19. The method of claim 18 and further comprising:

placing the calibration unit in a different location in the radar's field of view to further calibrate the vicinity monitoring unit.

20. The method of claim 18 and further comprising:

coupling the vicinity monitoring unit to a warning device; monitoring objects in the field of view of the radar; and sending a warning signal to one or more of the objects if a hazardous situation is detected.

* * * * *